US010293774B2

(12) United States Patent
Chiang

(10) Patent No.: US 10,293,774 B2
(45) Date of Patent: May 21, 2019

(54) AIRBAG FILM ROLL RETENTION STRUCTURE

(71) Applicant: Tung-Lung Chiang, New Taipei (TW)

(72) Inventor: Tung-Lung Chiang, New Taipei (TW)

(*) Notice: Subject to any disclaimer, the term of this patent is extended or adjusted under 35 U.S.C. 154(b) by 54 days.

(21) Appl. No.: 15/602,085

(22) Filed: May 22, 2017

(65) Prior Publication Data
US 2018/0334126 A1 Nov. 22, 2018

(51) Int. Cl.
B60R 21/16 (2006.01)
B60R 21/20 (2011.01)
B60R 21/237 (2006.01)

(52) U.S. Cl.
CPC ............ B60R 21/20 (2013.01); B60R 21/237 (2013.01); *B60R 2021/161* (2013.01)

(58) Field of Classification Search
CPC ......... B65B 31/04; B65B 41/10; B65H 16/02; B65H 75/241; B65H 2402/5152; B65H 16/023; F16C 13/00; B60R 21/20; B60R 21/237; B60R 2021/161
See application file for complete search history.

(56) References Cited

U.S. PATENT DOCUMENTS

| 7,942,364 | B2* | 5/2011 | Yu Chen | B65H 75/241 242/578.2 |
| 9,010,675 | B2* | 4/2015 | Harrison | B65B 67/085 242/578.2 |
| 9,540,211 | B2* | 1/2017 | Yu Chen | B65H 75/242 |
| 2009/0275453 | A1* | 11/2009 | Wu | F16C 13/00 492/47 |
| 2013/0164052 | A1* | 6/2013 | Okamoto | F16C 13/00 399/313 |
| 2017/0267387 | A1* | 9/2017 | Yu Chen | B65B 67/085 |

FOREIGN PATENT DOCUMENTS

KR 20160004208 U * 12/2016
TW M517716 U * 2/2016

* cited by examiner

*Primary Examiner* — Drew J Brown
(74) *Attorney, Agent, or Firm* — Leong C. Lei

(57) ABSTRACT

An airbag film roll retention structure includes a retaining engagement member mountable to an airbag film roll, a mounting section formed on one end of the retaining engagement member, a first alignment section formed on one end of the mounting section, abutting sections formed on an opposite end of the mounting section, and a second alignment section defined between the abutting sections, which are coupled to each other to be positioned on an axle assembly so as to achieve advantages, such as efficient mounting and positioning and ensuring center alignment to prevent eccentric oscillation.

17 Claims, 5 Drawing Sheets

AIRBAG FILM ROLL RETENTION STRUCTURE

(a) TECHNICAL FIELD OF THE INVENTION

The present invention relates generally to a retention structure of an airbag film roll that allows for efficient mounting and positioning and also helps maintain center alignment to prevent undesired eccentric oscillation.

(b) DESCRIPTION OF THE PRIOR ART

To provide a supply of a large amount of airbag films for easy access and use, a common solution is to wrap airbag films around a cylindrical object. When it comes time to use, the cylindrical object can be directly fit over a roller.

The roller generally comprises an axle and bearing mounted on the axle. The bearings allow the cylindrical object to freely rotate. However, it often occurs that the roller and the cylindrical object are not in proper center alignment with each other so that eccentric oscillation may occur.

SUMMARY OF THE INVENTION

An objective of the present invention is to prevent eccentric oscillation from occurring by ensuring proper center alignment.

Another objective of the present invention is to increase the speed of mounting.

To achieve the above objectives, the present invention comprises a retaining engagement member. The retaining engagement member has an end on which a mounting section is formed and an opposite end on which a channel section is formed. The mounting section is formed with at least one first alignment section at a location away from the channel section. The mounting section is formed with a plurality of abutting sections at a location close to the channel section and the abutting sections define therebetween at least one second alignment section.

To use, the retaining engagement member is first set on the airbag film roll and an axle assembly is put to penetrate through the retaining engagement member, wherein the first alignment section and the second alignment section guide the axle assembly to automatically align with a center and the first alignment section, the abutting sections, and the second alignment section are mounted on the axle assembly. With the above technique, the problem that a roller of the prior art may suffer eccentric oscillation due to improper center alignment of the roller can be overcome and advantages, such as efficient mounting and positioning with center alignment achieved to prevent eccentric oscillation, can be achieved.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
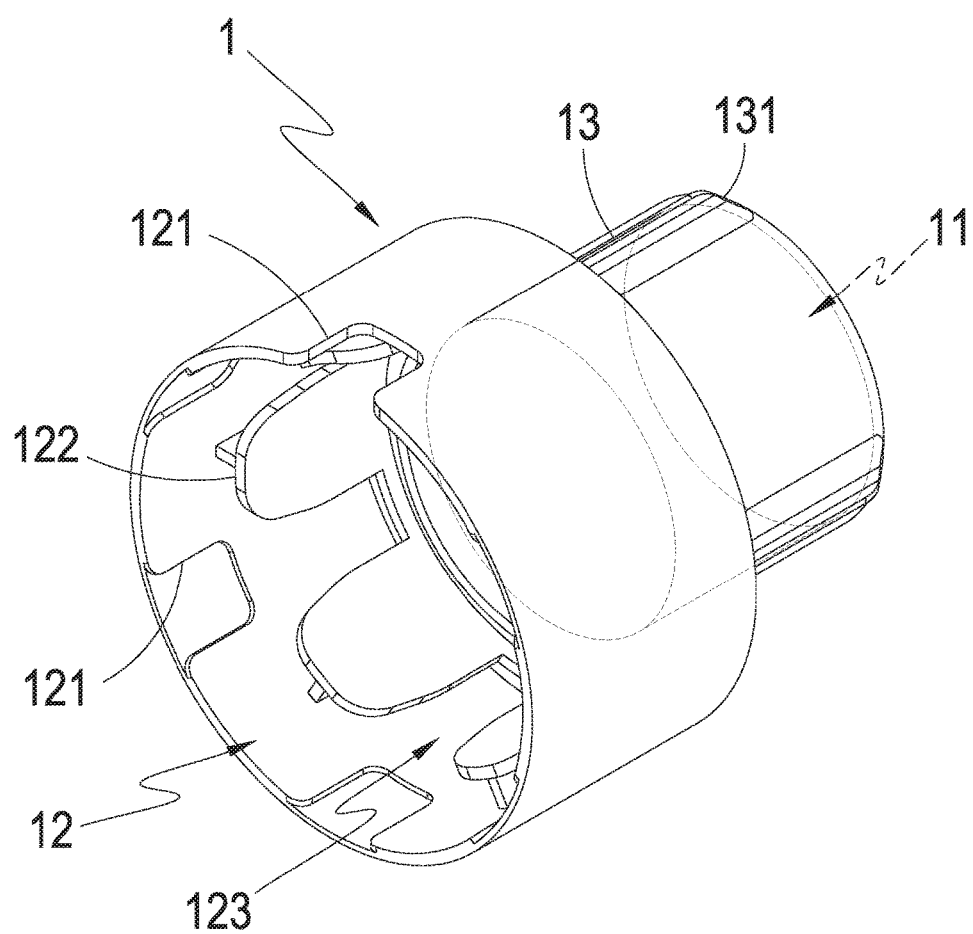
FIG. 1 is a schematic view illustrating a structure of the present invention.
Figure 2:
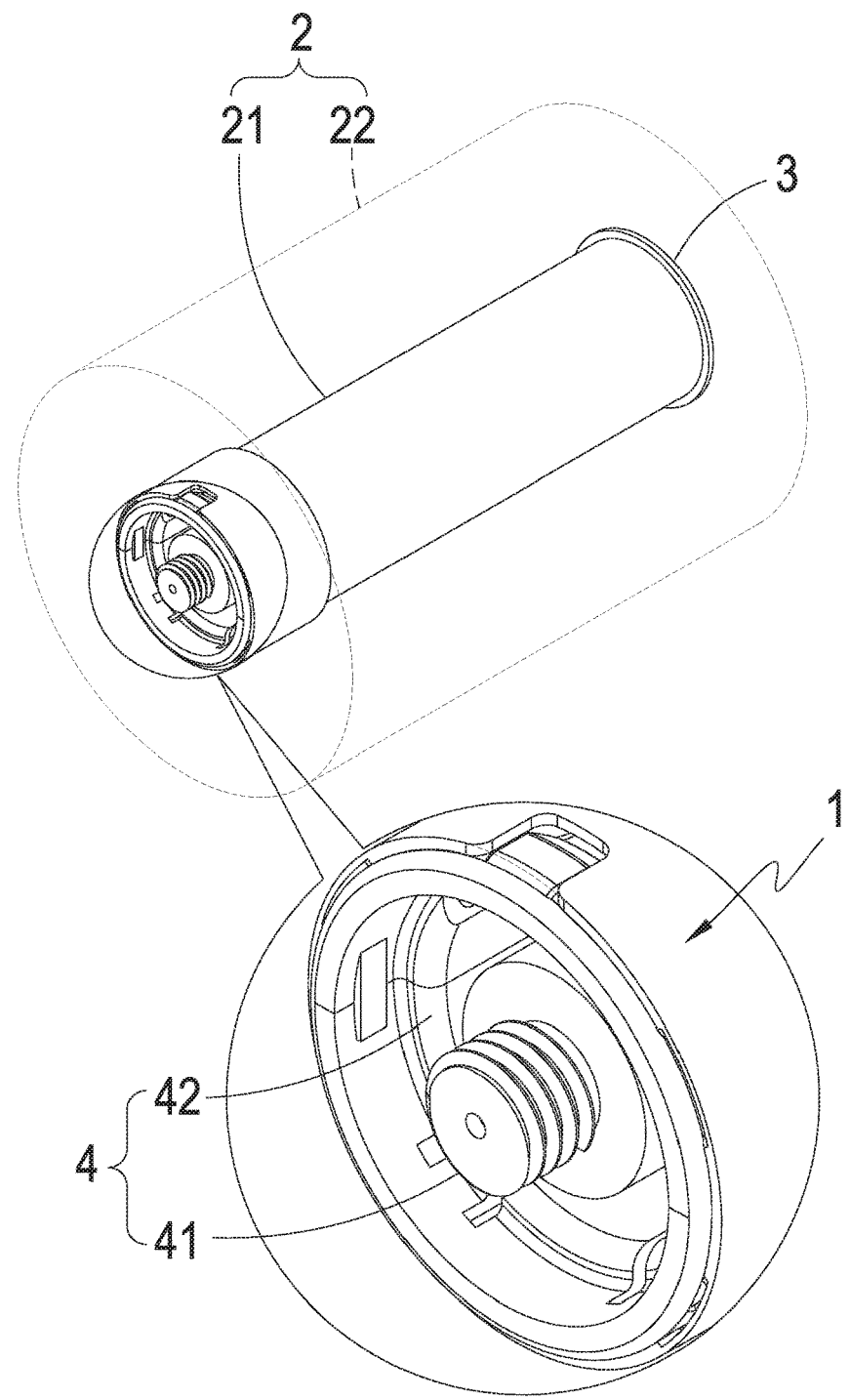
FIG. 2 is a schematic view illustrating an embodiment of the present invention.
Figure 3:
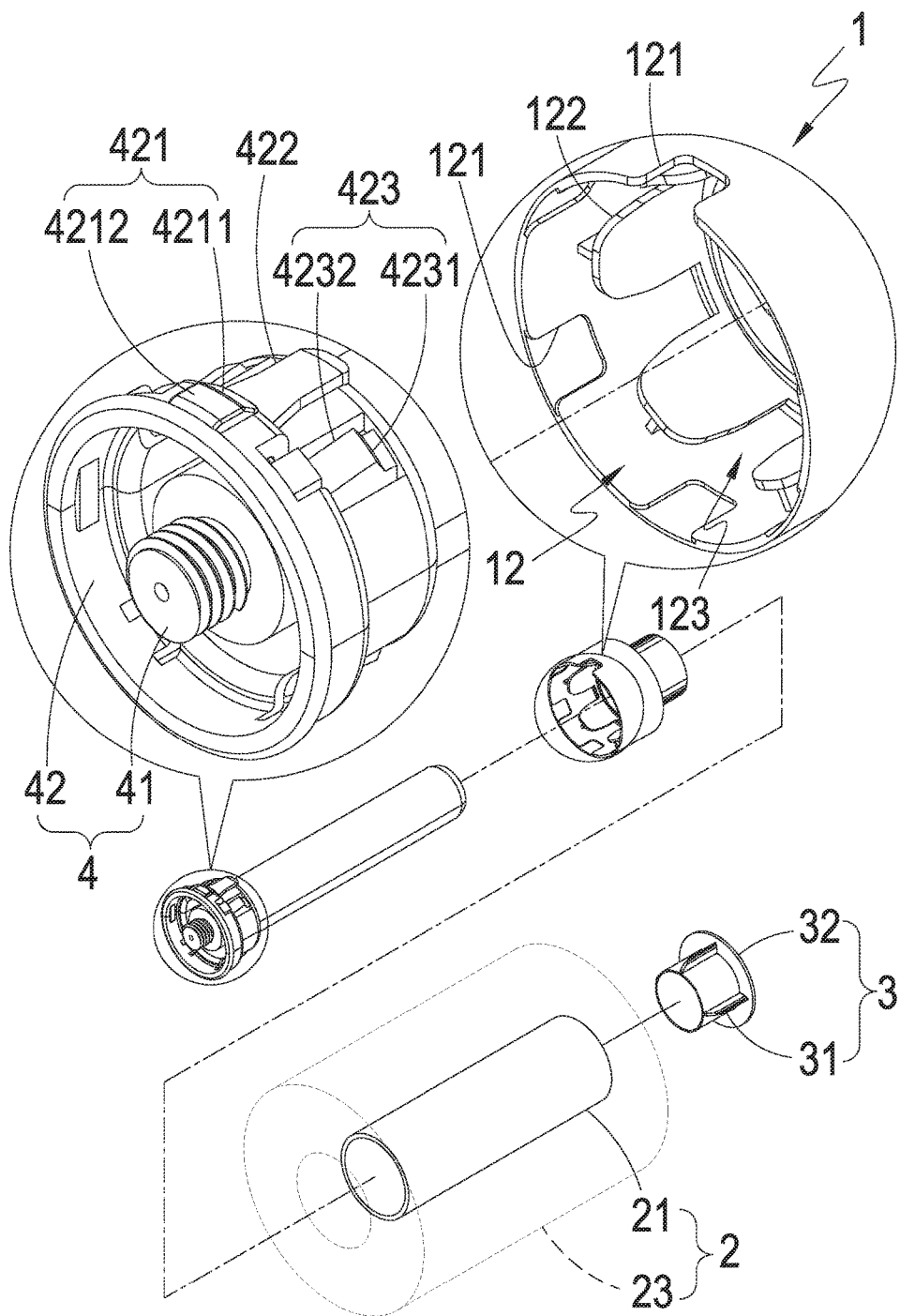
FIG. 3 is an exploded view illustrating the embodiment of the present invention.
Figure 4:
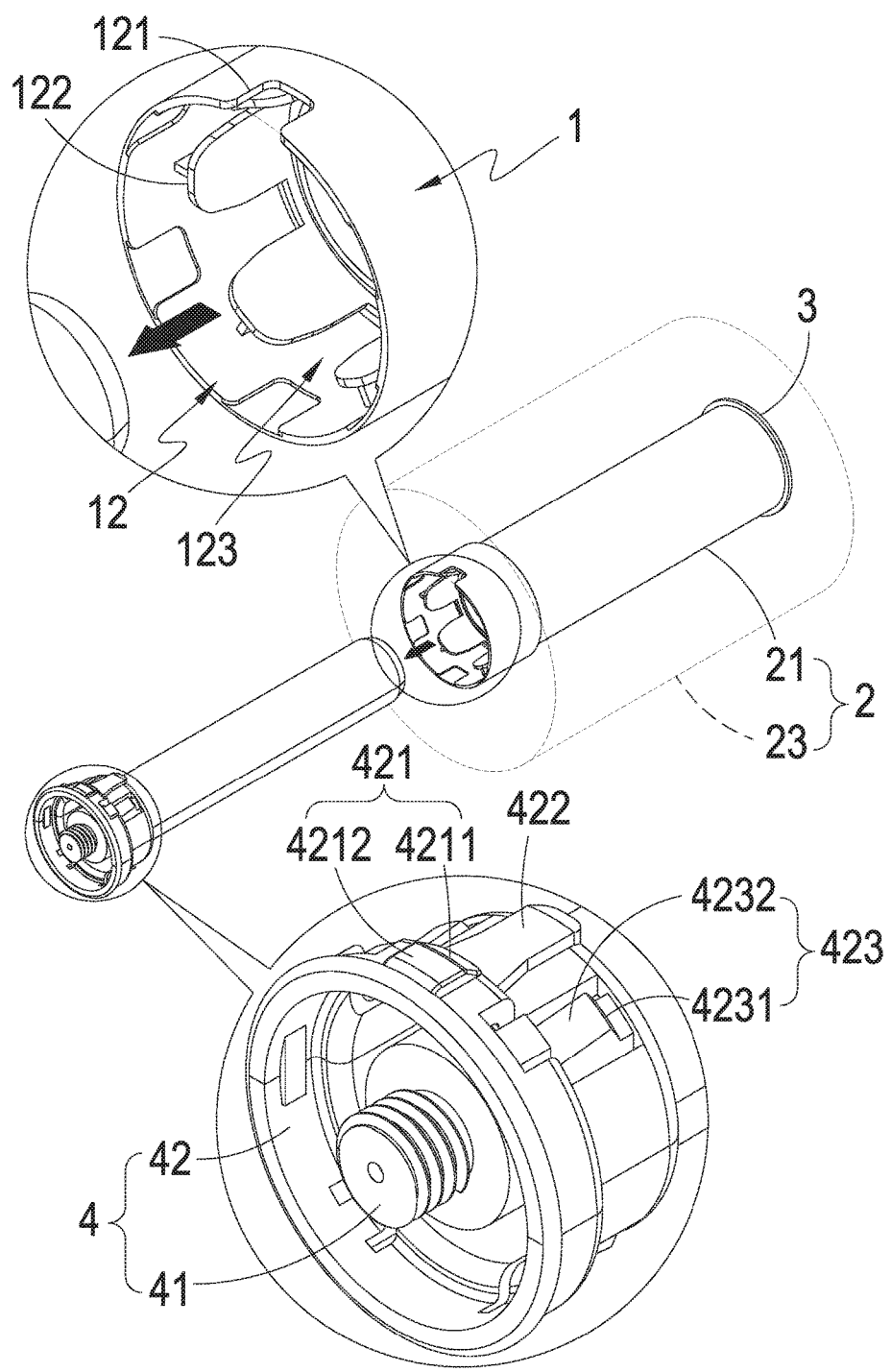
FIG. 4 is a schematic view illustrating an example of use of the present invention.

Referring to FIGS. 1-3, it can be seen that the present invention comprises a retaining engagement member 1, a mounting section 12, a channel section 11, at least one first alignment section 121, a plurality of abutting sections 122, and a plurality of abutting sections 122. The retaining engagement member 1 is provided for being mounted to on an airbag film roll 2. The mounting section 12 is formed at one end of the retaining engagement member 1 and the channel section 11 is formed at an opposite end of the retaining engagement member 1 and is in communication with the mounting section 12. The retaining engagement member 1 is provided with at least one coupling section 13 on an outer wall thereof at a location adjacent to an end of the channel section 11 for coupling with and fixing the airbag film roll 2. The coupling section 13 is provided with at least one insertion slope 131 at one side thereof adjacent to the airbag film roll 2.

The first alignment section 121 is formed on the mounting section 12 at a location distant from the channel section 11 and in the form of one of a groove and an opening and showing a configuration of diverging in a direction away from the airbag film roll 2. In the instant embodiment, an example that comprises a plurality of first alignment sections 121 arranged in a circumferentially distributed manner is provided for illustration. Each of the abutting sections 122 is formed as a raising portion at a location of the mounting section 12 that is close to the channel section 11 and shows a configuration of converging in a direction away from the airbag film roll 2. In the instant embodiment, an example that comprises a plurality of abutting sections 122 arranged in a circumferentially distributed manner is provided for illustration. A second alignment section 123 is defined between every two adjacent ones of the abutting sections 122 and shows a configuration of diverging in a direction away from the airbag film roll 2.

The airbag film roll 2 comprises a reel 21 and at least one airbag film 22 wound around the reel 21 and has an end to which the retaining engagement member 1 is mounted and an opposite end to which an auxiliary member 3 is mounted.

The auxiliary member 3 is provided with at least one connection section 31 on one end thereof adjacent to the airbag film roll 2 and is also provided with at least one stop section 32 on one end thereof that is distant from the connection section 31.

The retaining engagement member 1 and the auxiliary member 3 receive an axle assembly 4 to extend therethrough. The axle assembly 4 comprises a rotation axle 41 and a rotary casing 42 that is mounted on the rotation axle 41 and is rotatable. The rotary casing 42 is provided, on an end thereof adjacent to the retaining engagement member 1, with at least one first limiting section 421 that corresponds, in shape, to the first alignment section 121. The first limiting section 421 comprises a first guide slope 4211 facing the retaining engagement member 1 and a first engagement slope 4212 located at one side of the first guide slope 4211 and facing away from the retaining engagement member 1 such that the first limiting section 421 has a largest diameter at a portion that is located at a connection between the first guide slope 4211 and the first engagement slope 4212. The rotary casing 42 is provided, on the end thereof adjacent to the retaining engagement member 1, with at least one second limiting section 422 that corresponds, in shape, to each of the abutting sections 122 and the second alignment section 123. The second limiting section 422 has a configuration of converging in a direction toward the second alignment section 123. The rotary casing 42 is provided, on the end thereof adjacent to the retaining engagement member 1, with a plurality of resilient positioning sections 423 respectively corresponding, in position, to the abutting sections 122 and comprising a resilient guide slope 4231 facing the retaining engagement member 1 and a resilient engagement slope 4232 located at one side of the resilient guide slope 4231 and facing away from the retaining engagement member 1, such that the resilient positioning sections 423 has a largest diameter at a portion that is located at a connection between the resilient guide slope 4231 and the resilient engagement slope 4232. Further, the above description provides just one feasible embodiment of the present invention, and the present invention is not limited to such an embodiment.

Referring to FIGS. 1-4, it can be seen that to use, the retaining engagement member 1 and the auxiliary member 3 are respectively set at two opposite sides of the airbag film roll 2 and the coupling section 13 and the connection section 31 are used to respectively have the retaining engagement member 1 and the auxiliary member 3 inserted into and fixed to the reel 21, wherein the insertion slope 131 allows the insertion to be conducted in a smooth manner and the stop section 32 is set in stopping engagement with and thus holding one side of the airbag film 22. Then, the axle assembly 4 is put to penetrate through the retaining engagement member 1 (the mounting section 12 and the channel section 11) and the auxiliary member 3, so that the rotation axle 41 is mounted to allow the rotary casing 42 to be rotatable in unison with the airbag film roll 2.

When the axle assembly 4 is put to penetrate through the retaining engagement member 1, due to the diverging configurations of the first alignment section 121 and the second alignment section 123 and the converging configuration of each of the abutting sections 122, and also the converging configuration of the second limiting section 422, the penetration can be conducted easily and alignment can be achieve automatically. Further, through the arrangement of the first guide slope 4211 of the first limiting section 421 and the resilient guide slope 4231 of the resilient positioning section 423, in combination with the first alignment sections 121 and the abutting sections 122, an effect of automatic center alignment may be achieved, while the first engagement slope 4212 and the resilient engagement slope 4232 provide an effect of retaining engagement so as to achieve the purpose of efficient mounting and automatic engagement and positioning and also to ensure center alignment between the retaining engagement member 1 and the axle assembly 4 to prevent eccentric oscillation caused by improper center alignment.

Figure 5:
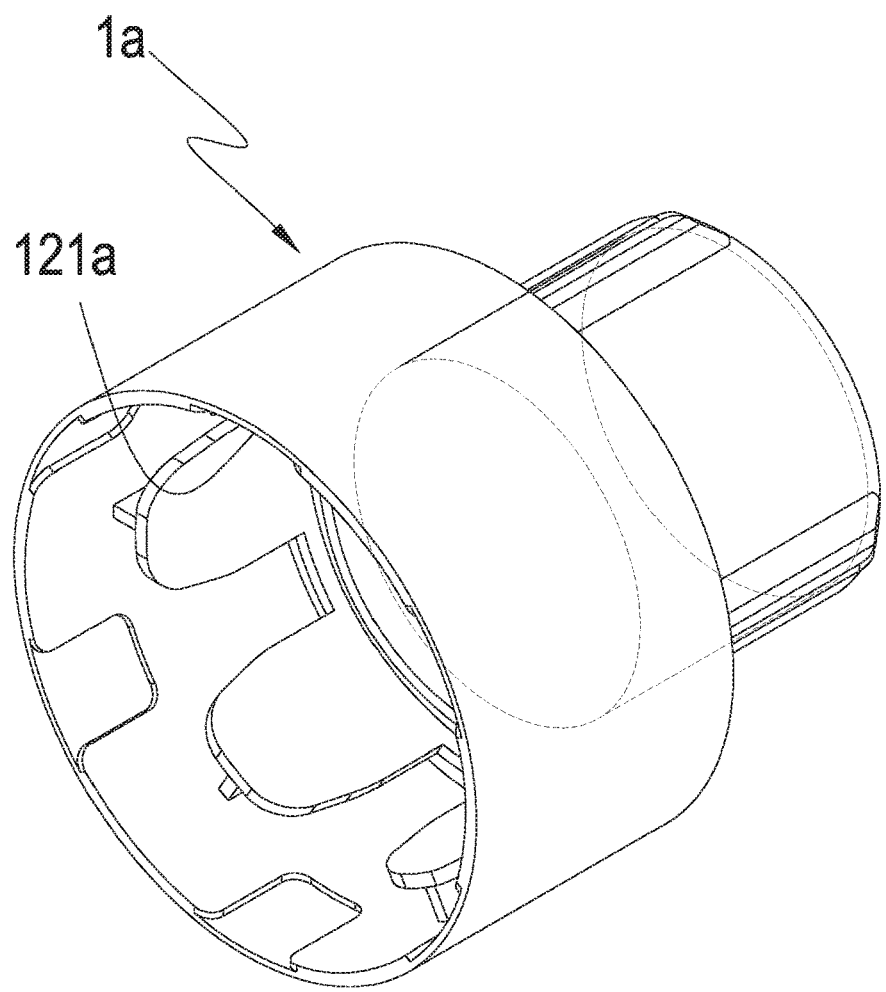
FIG. 5 is a schematic view illustrating a structure of another embodiment of the present invention.

Referring to FIG. 5, in a different embodiment, the retaining engagement member 1a is provided with first alignment sections 121a in the form of grooves or recesses to illustrate variations of the present invention.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. An airbag film roll retention structure, comprising:
   a retaining engagement member, which is mountable to an airbag film roll;
   a mounting section, which is formed at one end of the retaining engagement member;
   a channel section, which is formed at an opposite end of the retaining engagement member and in communication with the mounting section;
   at least one first alignment section, which is formed on the mounting section at a location distant from the channel section;
   a plurality of abutting sections, each of which is formed as a raising portion at a location of the mounting section that is close to the channel section; and
   at least one second alignment section, which is defined between the abutting sections;
   wherein each of the abutting sections shows a configuration of converging in a direction away from the airbag film roll.

2. The airbag film roll retention structure according to claim 1, wherein the first alignment section in the form of one of a groove and an opening.

3. The airbag film roll retention structure according to claim 1, wherein the retaining engagement member is provided with at least one coupling section on an outer wall thereof at a location adjacent to an end of the channel section for coupling with and fixing the airbag film roll.

4. The airbag film roll retention structure according to claim 3, wherein the coupling section is provided with at least one insertion slope at one side thereof adjacent to the airbag film roll.

5. The airbag film roll retention structure according to claim 1, wherein the first alignment section shows a configuration of diverging in a direction away from the airbag film roll.

6. The airbag film roll retention structure according to claim 1, wherein the second alignment section shows a configuration of diverging in a direction away from the airbag film roll.

7. The airbag film roll retention structure according to claim 1, wherein the airbag film roll comprises a reel and at least one airbag film wound around the reel.

8. The airbag film roll retention structure according to claim 1, wherein the retaining engagement member is mounted to an end of the airbag film roll and an opposite end of the airbag film roll comprises an auxiliary member mounted thereto.

9. The airbag film roll retention structure according to claim 8, wherein the auxiliary member is provided with at least one connection section on one end thereof adjacent to the airbag film roll and is also provided with at least one stop section on one end thereof that is distant from the connection section.

10. The airbag film roll retention structure according to claim 8, wherein the retaining engagement member and the auxiliary member receive an axle assembly to extend therethrough.

11. The airbag film roll retention structure according to claim 10, wherein the axle assembly comprises a rotation axle and a rotary casing that is mounted on the rotation axle 41 and is rotatable.

12. The airbag film roll retention structure according to claim 11, wherein the rotary casing is provided, on an end thereof adjacent to the retaining engagement member, with at least one first limiting section that corresponds, in shape, to the first alignment section.

13. The airbag film roll retention structure according to claim 12, wherein the first limiting section comprises a first guide slope facing the retaining engagement member and a first engagement slope located at one side of the first guide slope and facing away from the retaining engagement member.

14. The airbag film roll retention structure according to claim 11, wherein the rotary casing is provided, on one end thereof adjacent to the retaining engagement member, with at least one second limiting section that corresponds, in shape, to each of the abutting sections and the second alignment section.

15. The airbag film roll retention structure according to claim 14, wherein the second limiting section has a configuration of converging in a direction toward the second alignment section.

16. The airbag film roll retention structure according to claim 11, wherein the rotary casing is provided, on one end thereof adjacent to the retaining engagement member, with a plurality of resilient positioning sections respectively corresponding, in position, to the abutting sections.

17. The airbag film roll retention structure according to claim 16, wherein the resilient positioning sections each comprise a resilient guide slope facing the retaining engagement member and a resilient engagement slope located at one side of the resilient guide slope and facing away from the retaining engagement member.

* * * * *